(12) United States Patent
Roy et al.

(10) Patent No.: US 9,755,883 B1
(45) Date of Patent: Sep. 5, 2017

(54) SYSTEMS AND METHODS FOR DETECTING BEAM-FORMED ORTHOGONAL FREQUENCY DIVISION MULTIPLEXING (OFDM) PACKETS

(71) Applicant: Marvell International Ltd., Hamilton (BM)

(72) Inventors: Sayak Roy, West Bengal (IN); Ankit Sethi, Maharashtra (IN); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/156,777

(22) Filed: May 17, 2016

Related U.S. Application Data

(60) Provisional application No. 62/163,609, filed on May 19, 2015.

(51) Int. Cl.
| | |
|---|---|
| *H04L 27/28* | (2006.01) |
| *H04K 1/10* | (2006.01) |
| *H04L 27/26* | (2006.01) |
| *H04L 25/02* | (2006.01) |
| *H04B 7/12* | (2006.01) |
| *H04B 7/0413* | (2017.01) |

(52) U.S. Cl.
CPC ....... *H04L 27/2695* (2013.01); *H04B 7/0413* (2013.01); *H04B 7/12* (2013.01); *H04L 25/0204* (2013.01); *H04L 27/265* (2013.01)

(58) Field of Classification Search
CPC ............. H04L 27/2695; H04L 25/0204; H04L 27/265; H04L 5/0023; H04B 7/12; H04B 7/0413; H04B 7/0617; H04B 17/11; H04B 7/0421

USPC .......................................... 375/260, 219, 220
See application file for complete search history.

(56) References Cited

U.S. PATENT DOCUMENTS

| | | | | |
|---|---|---|---|---|
| 8,219,891 B2* | 7/2012 | Lakkis | ................. | H04B 7/0617 455/41.2 |
| 8,873,484 B1* | 10/2014 | Lee | ...................... | H04B 7/0617 370/329 |
| 8,891,597 B1* | 11/2014 | Zhang | .................... | H04B 17/11 375/220 |
| 9,112,553 B1* | 8/2015 | Zhang | .................... | H04L 5/0023 |
| 2004/0042439 A1* | 3/2004 | Menon | .................... | H01Q 3/26 370/343 |
| 2007/0249296 A1* | 10/2007 | Howard | ............... | H04B 7/0421 455/101 |

\* cited by examiner

*Primary Examiner* — Phuong Phu

(57) ABSTRACT

Systems and methods described herein provide a method for detecting beamformed detecting beam-formed orthogonal frequency division multiplexing (OFDM) packets. The method includes receiving, at a receiver, a data signal including a data packet, and selecting a set of frequency domain tones associated with the data signal for channel estimation. The method further includes calculating a plurality of differential parameters between adjacent frequency domain tones from the set of frequency domain tones. The method further includes identifying a jump when a first differential parameter from the plurality of differential parameters exceeds a jump threshold. The method further includes obtaining an accumulative count of jumps for the set of frequency domain tones, and identifying the data packet is beamformed when the accumulative count exceeds a jump limit.

18 Claims, 11 Drawing Sheets

SYSTEMS AND METHODS FOR DETECTING BEAM-FORMED ORTHOGONAL FREQUENCY DIVISION MULTIPLEXING (OFDM) PACKETS

CROSS-REFERENCE TO RELATED APPLICATION

This disclosure claims the benefit of U.S. Provisional Patent Application No. 62/163,609, filed May 19, 2015, which is hereby incorporated by reference herein in its entirety.

FIELD OF USE

This disclosure relates to a beam-forming scheme that uses orthogonal frequency division multiplexing (OFDM) modulation in a multiple-input multiple-output (MIMO) channel in a wireless data transmission system, for example, a wireless local area network (WLAN) implementing the IEEE 802.11n/a/g standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In a wireless MIMO system, beamforming technique is used to control the directionality of the transmission and reception of radio signals. For example, the phase and relative amplitude of a radio signal can be controlled at each transmitter to create a pattern of constructive and destructive interference in the wavefront. At the receiver, information from different sensors is combined in a way where the expected pattern of radiation can be observed.

In 802.11n/a/g standards, which uses OFDM modulation, there is no information in the packet preamble that may allow the receiver to directly identify if the received OFDM packet is beamformed or not. Identification of whether the received packet is beamformed or not can help the receiver in switching to the respective packet decoding algorithm that performs better for beamformed packets, but may not perform as well for non-beamformed packets.

SUMMARY

Systems and methods described herein provide a method for detecting beamformed detecting beam-formed orthogonal frequency division multiplexing (OFDM) packets. The method includes receiving, at a receiver, a data signal including a data packet, and selecting a set of frequency domain tones associated with the data signal for channel estimation. The method further includes calculating a plurality of differential parameters between adjacent frequency domain tones from the set of frequency domain tones. The method further includes identifying a jump when a first differential parameter from the plurality of differential parameters exceeds a jump threshold. The method further includes obtaining an accumulative count of jumps for the set of frequency domain tones, and identifying the data packet is beamformed when the accumulative count exceeds a jump limit.

In some implementations, the set of frequency domain tones are obtained via fast fourier transform of the received data signal.

In some implementations, the differential parameters are phase differences or magnitude differences.

In some implementations, the jump threshold includes a two-sided threshold or a one-sided threshold.

In some implementations, the jump is a first jump associated with a first receiver chain. The method further includes identifying a second jump associated with a second receiver chain, and identifying a true jump when both the first jump and the second jump are identified.

In some implementations, the first jump is not added to the accumulative count when no jump is identified with the second receiver chain.

In some implementations, the accumulative count includes a number of true jumps when there are more than one receiver chain.

In some implementations, the method further includes accumulating a number of true jumps across the set of frequency domain tones.

In some implementations, the jump threshold or the jump limit is configured to depend on a power of the received data signal.

In some implementations, the method further includes processing the received data packet by selecting a data symbol processing procedure based on whether the data packet is beamformed.

Systems and methods described herein provide a system for detecting beamformed detecting beam-formed OFDM packets. The system includes a receiver configured to receive a data signal including a data packet. The system further includes a channel estimation module configured to select a set of frequency domain tones associated with the data signal. The system further includes a jump counting module configured to calculate a plurality of differential parameters between adjacent frequency domain tones from the set of frequency domain tones. The jump counting module is further configured to identify a jump when a first differential parameter from the plurality of differential parameters exceeds a jump threshold. The jump counting module is further configured to obtain an accumulative count of jumps for the set of frequency domain tones, and identify the data packet is beamformed when the accumulative count exceeds a jump limit.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
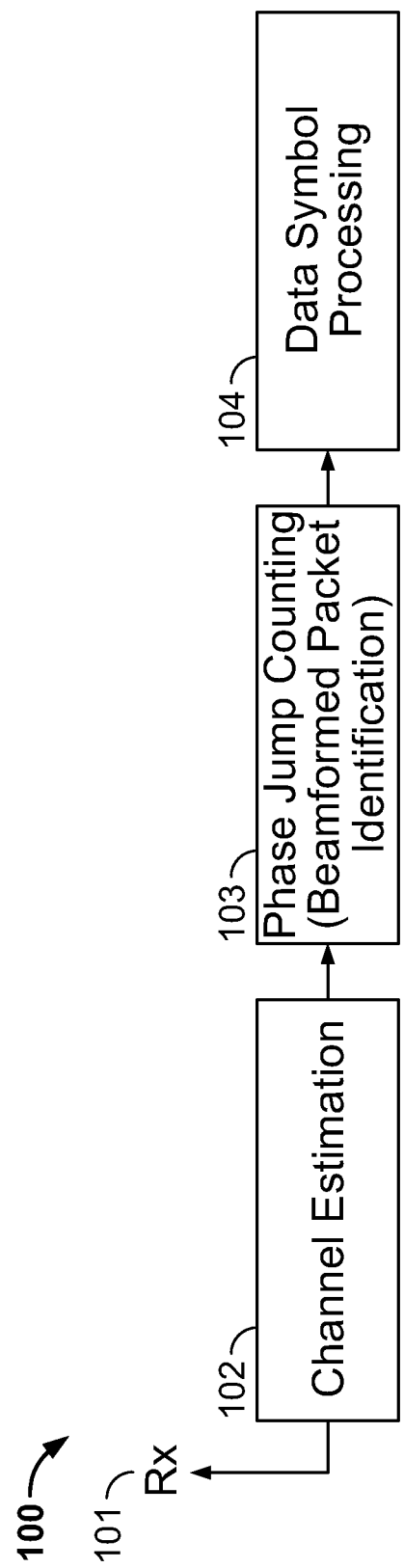
FIG. 1 provides an exemplary block diagram illustrating an example receiver system, according to one embodiment described herein.

This disclosure describes methods and systems for detecting beamformed OFDM packets in a MIMO system. According to this disclosure, a detection module at a wireless receiver may identify whether the received OFDM packet is beamformed or not by examining the phase of channel estimates. When channel estimation is accomplished before data-symbol processing, the identification at the detection module can determine whether the wireless receiver shall switch to a decoding algorithm respective to processing beamformed packets.

For example, OFDM symbols received at a wireless receiver can be decoded from the fast fourier transform (FFT) of the received signal. The received signal (after FFT) at the $k^{th}$ tone can be represented as:

$$y_k = h_k x_k + n_k, \ 1 \leq k \leq N_{Tones}$$

where $y_k$ denotes the received signal on tone k; $h_k$ denotes the channel gain corresponding to tone k; $x_k$ denotes the transmitted signal on tone k; $n_k$ denotes the additive noise at tone k; and $N_{Tones}$ denotes the number of tones. The channel gain coefficients $h_k$ are estimated using known training sequences.

In some implementations, a beamformer (e.g., a transmitter) may estimate the downlink (DL) channel coefficients from the uplink (UL) packets (implicit beamforming) and compute steering vector from the UL packets. For example, for maximum ratio combining (MRC) at a transmitter (Tx), the steering vector used by beamformer can be set as the complex conjugate of the estimates. Or alternatively, the beamformer can obtain the steering vector from the beamformee (e.g., the receiver for explicit beamforming), which does the computation at its end. The steering vector may then be used to 'steer' DL packets prior to transmission, which may increase reliability of the transmission.

In some implementations, while steering, beamformers may use tone-grouping techniques in which a single steering vector is used to steer a group of tones. For a tone group size of $N_{Tg}$, the steering vector changes only every $N_{Tg}$ tones and uses the same steering vector for $N_{Tg}$ tones. Thus phase jumps in the channel profile may occur under the influence of timing offsets in the channels, which may render the effective "steered channel" incoherent even if the original wireless channel is coherent.

In some implementations, to overcome the incoherency in the steered channel, techniques such as channel smoothing can be adopted, but such technique largely relies on the coherence of the channel being smoothed. Steered and unsteered packets may be segregated at the receiver and steered packets can thus be left out from being smoothed.

In accordance with the systems and methods disclosed herein, presence of jumps in the phase profile can be primarily examined with less focus on the magnitude of those jumps. A true phase jump can be determined based on combined information from all receiver (Rx) paths. In this way, the phase jump counting scheme can be used for identification of beamformed packets.

FIG. 1 provides an exemplary block diagram illustrating an example receiver system, according to one embodiment described herein. A receiver system 100 may include one or more Rx antenna(s) 101 to receive signals from a wireless channel. The received signal may be passed on to a channel estimation module 102, which may estimate channel coefficients from received packets. Meanwhile, the phase jump counting module 103 may identify whether the received packet is beamformed or not, as further illustrated in FIGS. 5-11. Based on the result of beamformed packet decision from module 103, the received signal can be passed to the data symbol processing module 104, which may select a procedure to process the received data signal respective to the beamforming format.

Figure 2:
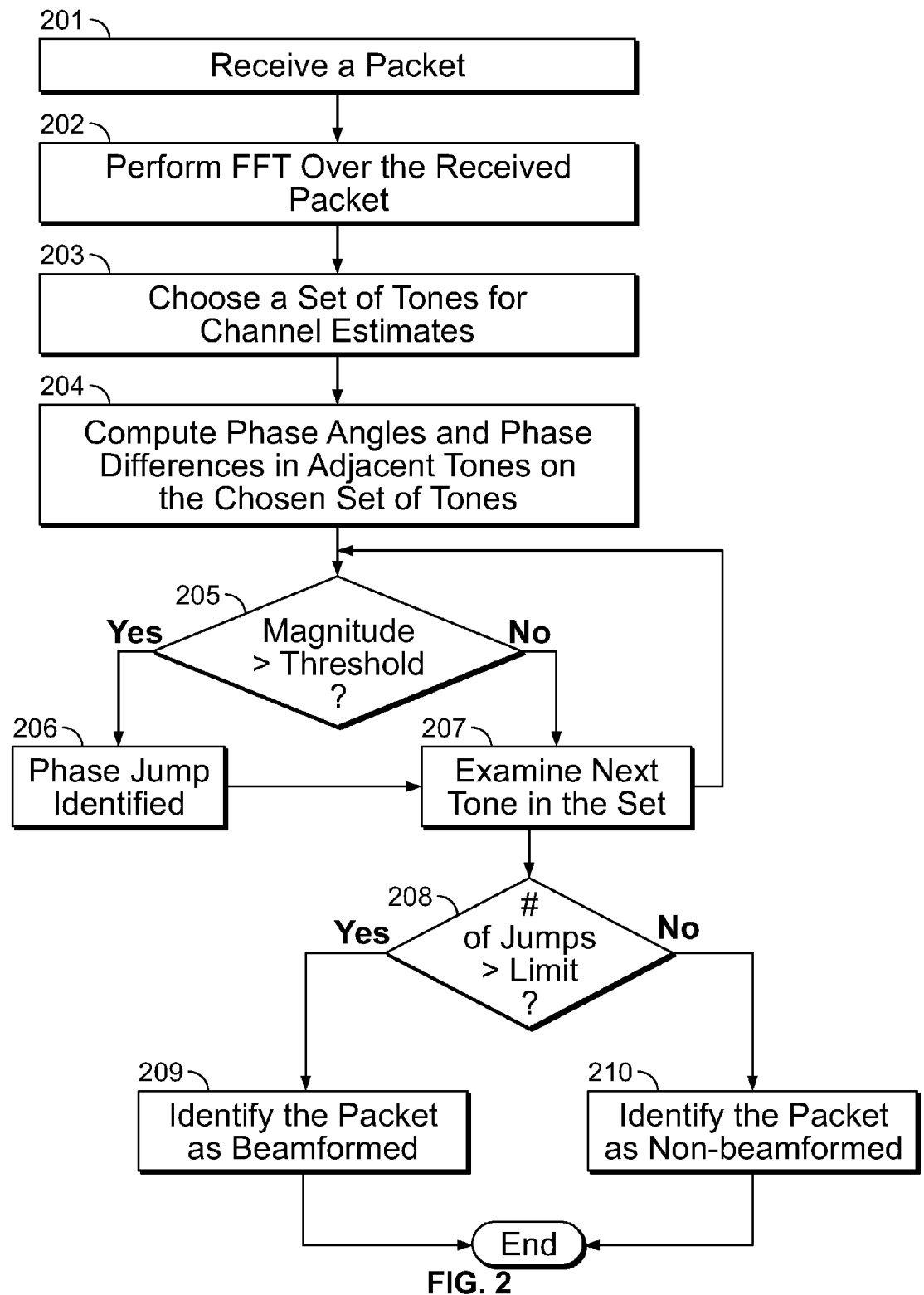
FIG. 2 provides an exemplary logic flow diagram illustrating aspects of detecting phase jumps to identify a beam-formed packet, according to one embodiment described herein.

FIG. 2 provides an exemplary logic flow diagram illustrating an overall process of detecting phase jumps to identify a beamformed packet, according to one embodiment described herein. At 201, a data packet may be received at a receiver. At 202, FFT can be performed over the received signal to generate a series of discrete values at different tones. At 203, a set of tones of channel estimates may be selected. For example, the selected tones can correspond to payload data of the data packet only, or a combination of payload data and pilot.

At 204, phase angles and phase differences with adjacent tones are then computed on the selected set of tones. Phase jumps can then be identified by comparing their magnitudes to a programmable threshold at 205, e.g., a jump threshold. The check may be a two-sided check or a one-sided check, as further illustrated in FIGS. 3-4. If the magnitude of a respective tone is greater than the jump threshold, then a phase jump is identified at 206. Otherwise, no phase jump is identified, and the magnitude of the next tone in the selected set is examined at 207, until all the tones in the selected set has been exhausted.

At 208, if the count of such identified phase jumps from 206 exceeds a programmable limit, e.g., the jump limit, then the packet is classified as a beamformed packet at 209, otherwise as an non-beamformed packet at 210. The two previously set quantities, e.g., the jump threshold and the jump limit, can be made receive-power dependent, as further illustrated in FIG. 7. In this way, optimal classification may be achieved near the sensitivity region.

Figure 3:
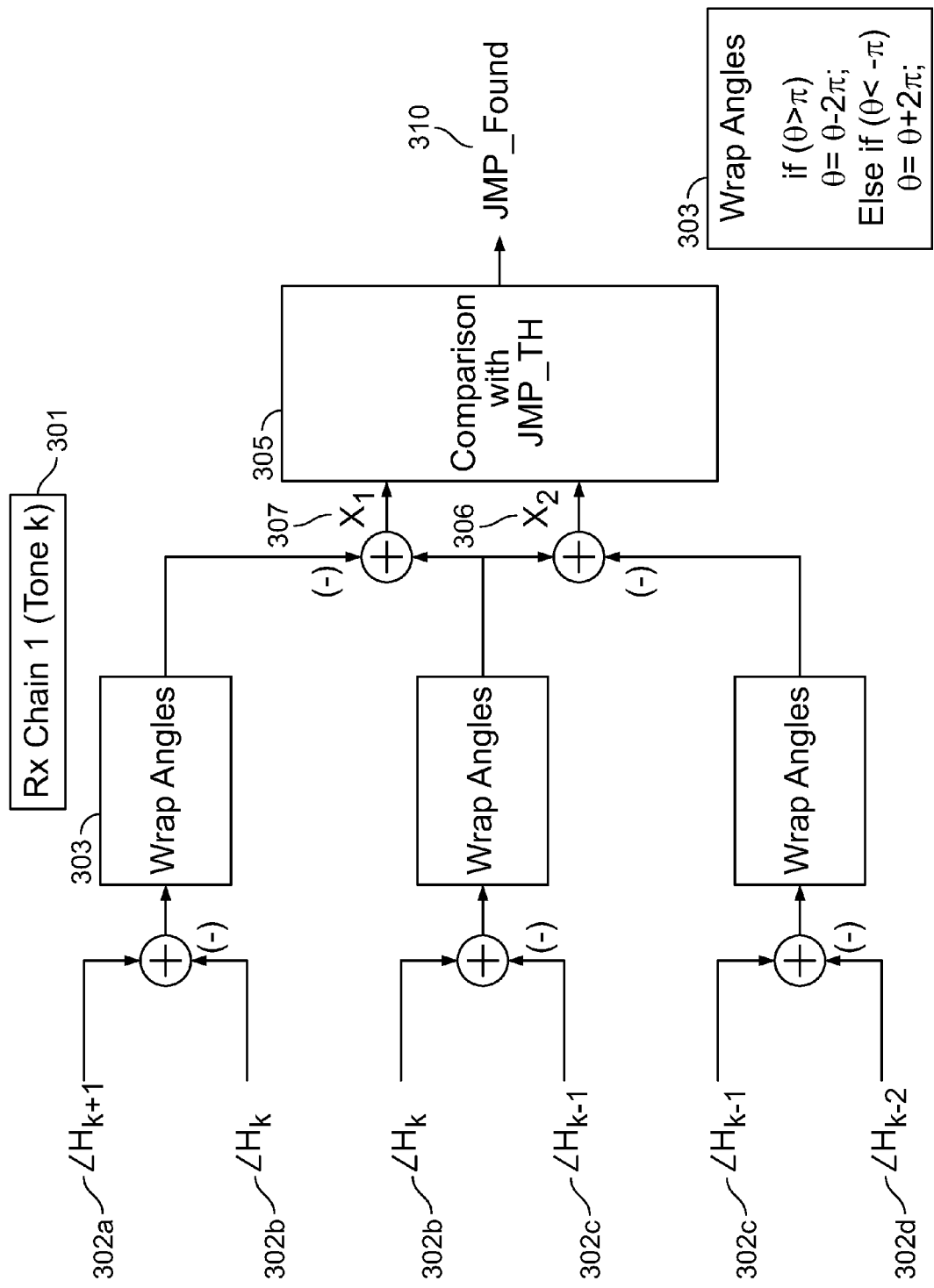
FIG. 3 provides an exemplary block diagram illustrating aspects of phase jump identification, according to one embodiment described herein.

FIG. 3 provides an exemplary block diagram illustrating aspects of phase jump identification, according to one embodiment described herein. When a set of tones has been selected (e.g., at 203 in FIG. 2), frequency domain channel estimates $h_k$ can be computed at the kth tone (e.g., 301). The phase differences of adjacent tones from these phase angles 302a-d may also be computed as $$\Delta\theta[k] = \angle h_k - \angle h_{k-1}.$$

The phase differences are then processed with a wrap angles module 303 to wrap the phase difference value between $[0,\pi]$.

In another implementation, instead of taking the phase difference between adjacent tones, the phase difference between non-adjacent tones may be used, e.g., $$\Delta\theta[k]=\angle h_k - \angle h_{k-N}.$$

where N is greater than 1.

The phase difference may be used to identify downlink multi-user (MU) beamformed packets as the beamformed bit is set to 1 in the VHT-SIG-A2 data format in 802.11a/c for all MU packets. Or alternatively, the phase difference can be used on high throughput long training fields (HTLTFs) as an additional check on the beamformed bit in SU (V)HT packets. It can also be used to override these bits if the phase profile may be smoothed.

At any given index k, a phase jump is identified with the phase jump quantities $X_1$ 307 and $X_2$ 306 are calculated as the difference between the adjacent phase differences and compared with the JMP_TH at 305, where JMP_TH denotes the jump threshold. The value of JMP_TH may depend on the measured in-band power of the received signal. Different power ranges may use different value of JMP_TH. At 305, if a jump is identified, then JPM_FOUND is set to be 1 at 310.

Figure 4:
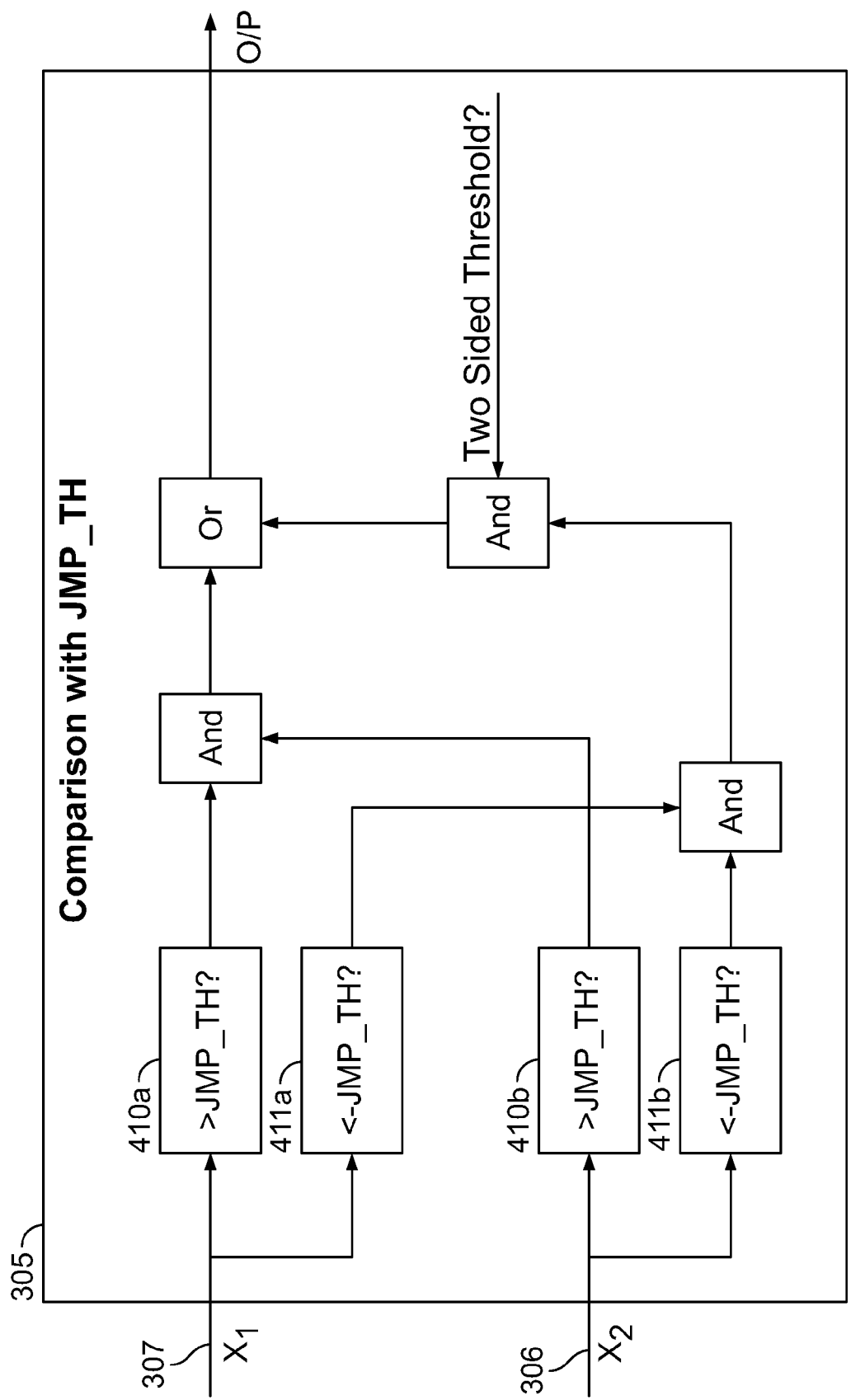
FIG. 4 provides an exemplary block diagram illustrating threshold check in a phase jump counting scheme (e.g., 305 in FIG. 3), according to one embodiment described herein.

FIG. 4 provides an exemplary block diagram illustrating threshold check in a phase jump counting scheme (e.g., 305 in FIG. 3), according to one embodiment described herein. As shown in FIG. 4, $X_1$ 307 and $X_2$ 306 as calculated in FIG. 3, can be passed to compare with the jump threshold at 410a-b and 411a-b. The output of each comparison is then directed to a series of logic operations to achieve the following:

For a Two-Sided Check, $$[(\Delta\theta[k]-\Delta\theta[k-1])>\text{JMP\_TH}\&\&(\Delta\theta[k]-\Delta\theta[k+1])>\text{JMP\_TH}]$$

or $$[(\Delta\theta[k]-\Delta\theta[k-1])<-\text{JMP\_TH}\&\&(\Delta\theta[k]-\Delta\theta[k+1])<-\text{JMP\_TH}]; \text{ or}$$

For a One-Sided Check, $$[(\Delta\theta[k]-\Delta\theta[k-1])>\text{JMP\_TH}\&\&(\Delta\theta[k]-\Delta\theta[k+1])>\text{JMP\_TH}]$$

Figure 5:
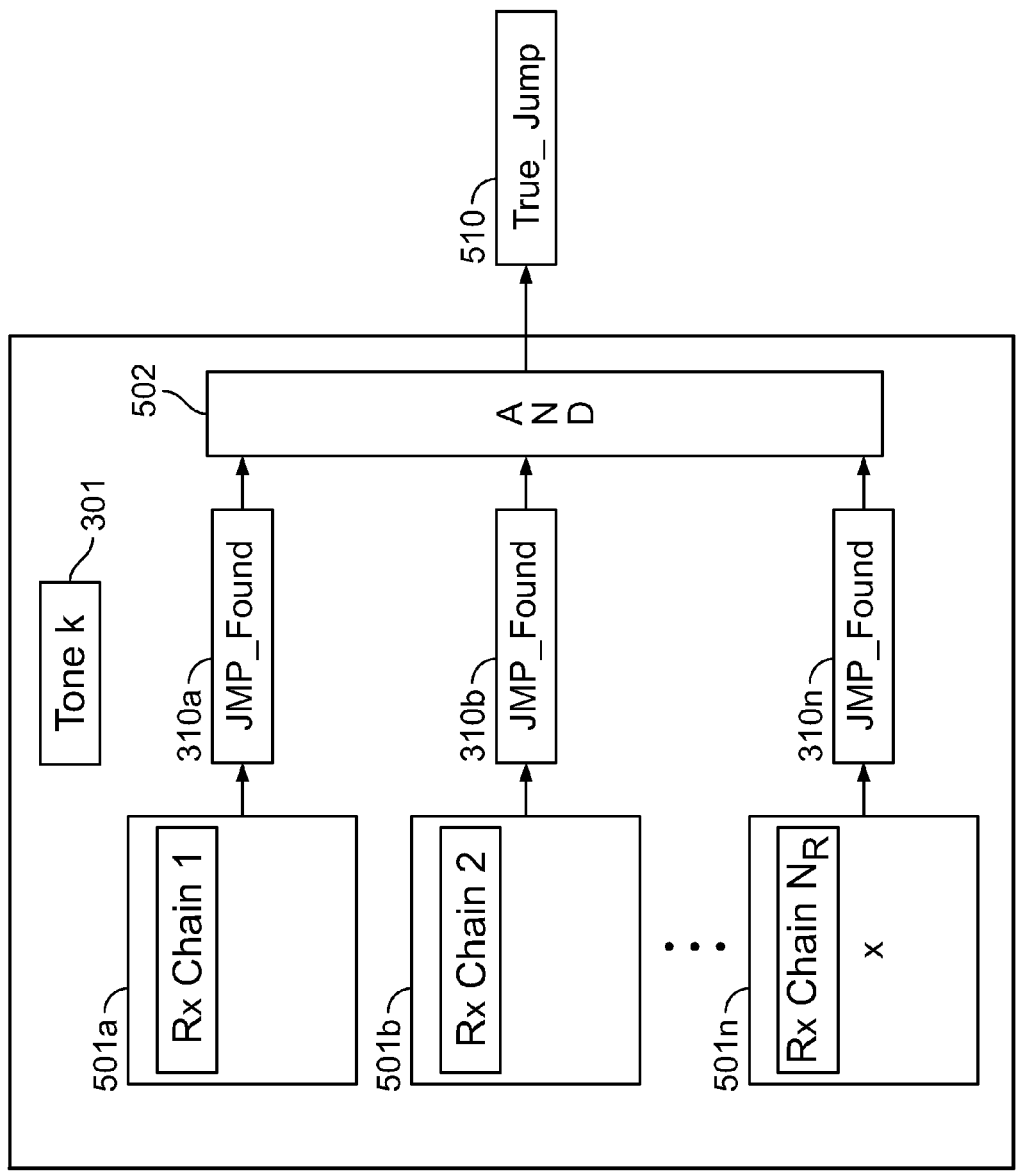
FIG. 5 provides an exemplary block diagram illustrating an example true jump architecture, according to one embodiment described herein.

FIG. 5 provides an exemplary block diagram illustrating an example true jump architecture, according to one embodiment described herein. At tone K 301, the JUMP_FOUND output 310a-n (e.g., each obtained in a similar way as 310 in FIG. 3) of different receiver chains 501a-n (e.g., antennas) are passed to an AND operation 502. If phase jumps exist at a given tone index for all receive chains, a "true jump" is said to exist at that tone, e.g., TRUE_JUMP is set to be 1 at 510.

Figure 6:
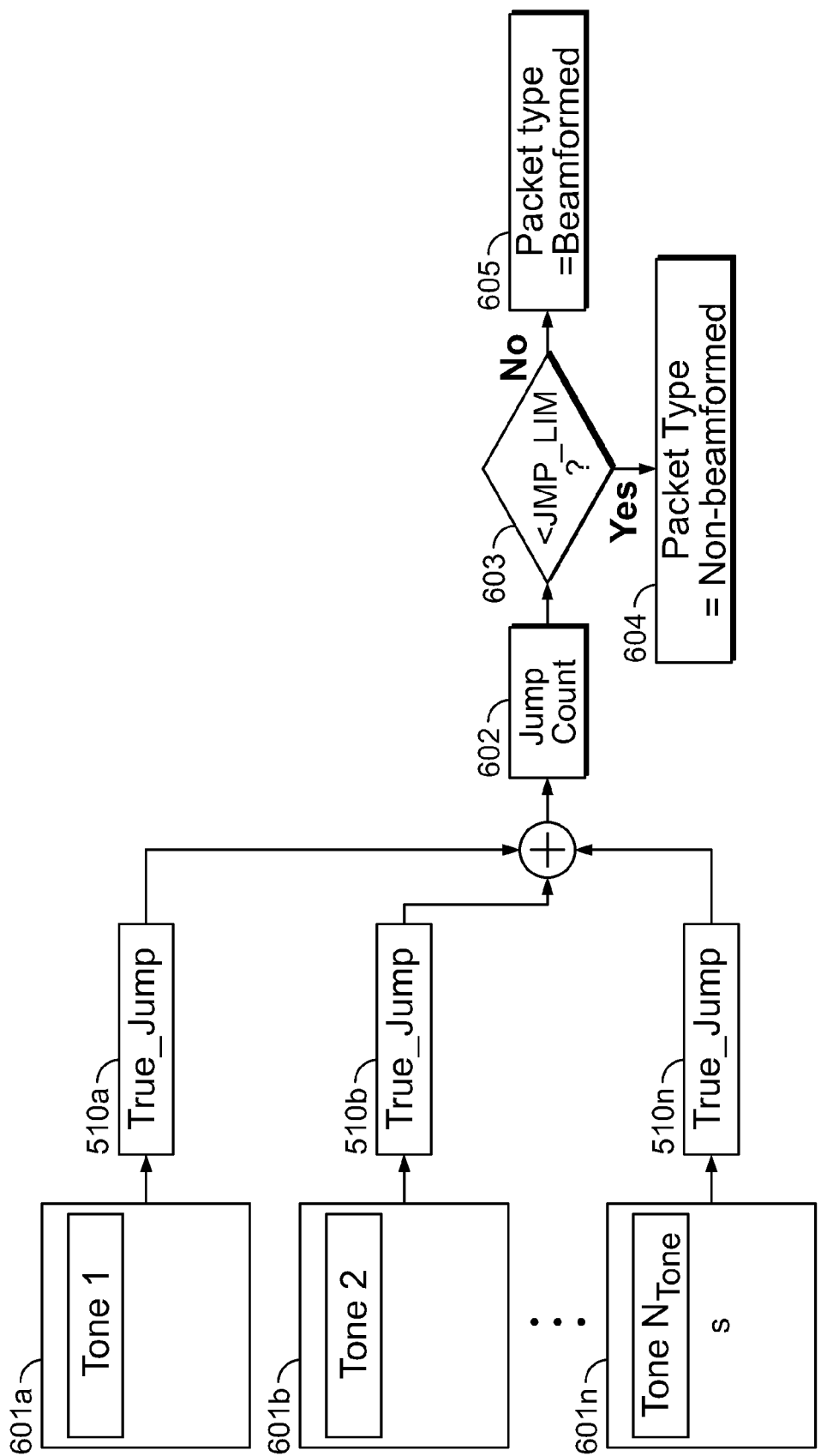
FIG. 6 provides an exemplary block diagram illustrating aspects of packet classification in a phase jump counting scheme, according to one embodiment described herein.

FIG. 6 provides an exemplary block diagram illustrating aspects of packet classification in a phase jump counting scheme, according to one embodiment described herein. The number of true jumps 510a-n (e.g., as obtained at 510 in FIG. 5) may then be accumulated across all tones 601a-n of the chosen set, which can be defined as the jump count 602. If the jump count exceeds or equals the jump limit JMP_LIM 603, the packet is identified as a beamformed packet 602, else it is identified as a non-beamformed packet 605.

Figure 7:
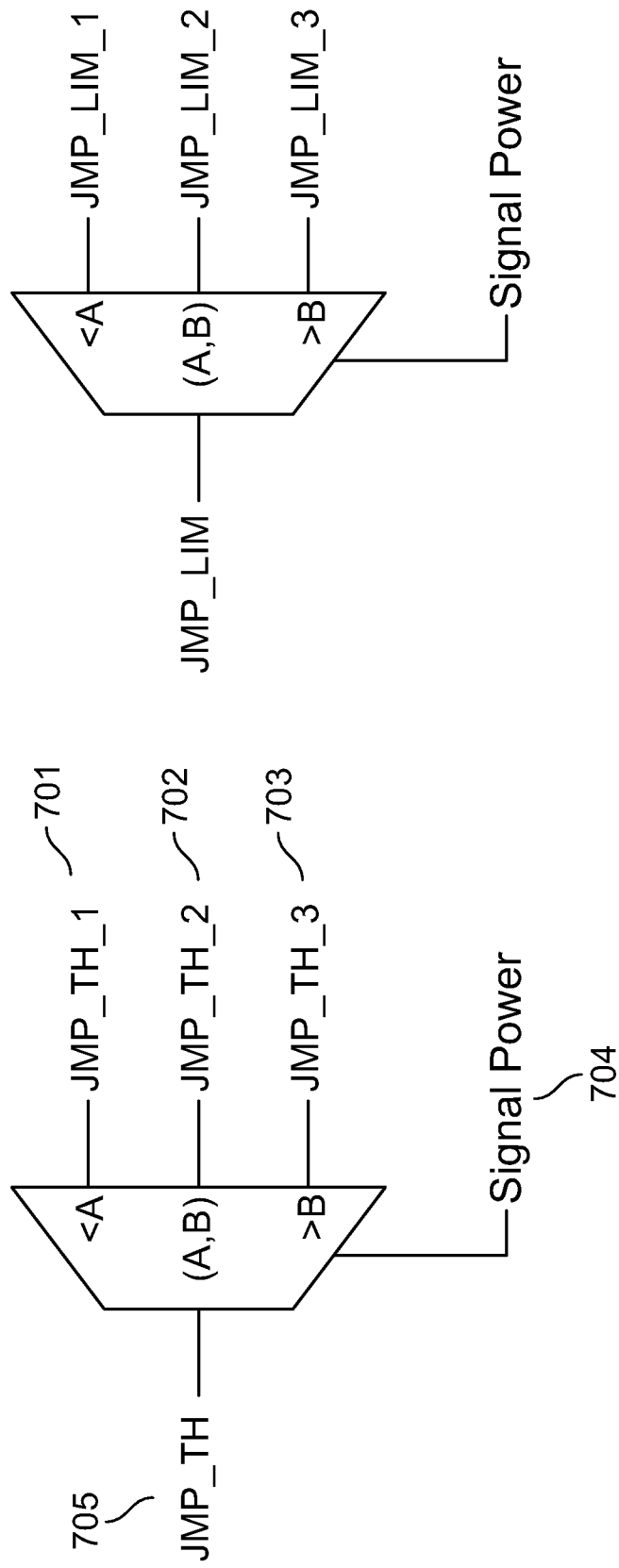
FIG. 7 provides exemplary block diagrams illustrating logic structures of power dependent thresholds in a phase jump counting scheme, according to one embodiment described herein.

FIG. 7 provides exemplary block diagrams illustrating logic structures of power dependent thresholds in a phase jump counting scheme, according to one embodiment described herein. The values JMP_TH and JMP_LIM may both have different values for different in-band power range. For example, the JMP_TH 705 may be set as different values 701-704 based on the in-band signal power level 704. Two different power thresholds A and B that divide the input power range into three sections can be used. Similar structure also applies to JMP_LIM.

Figure 8:
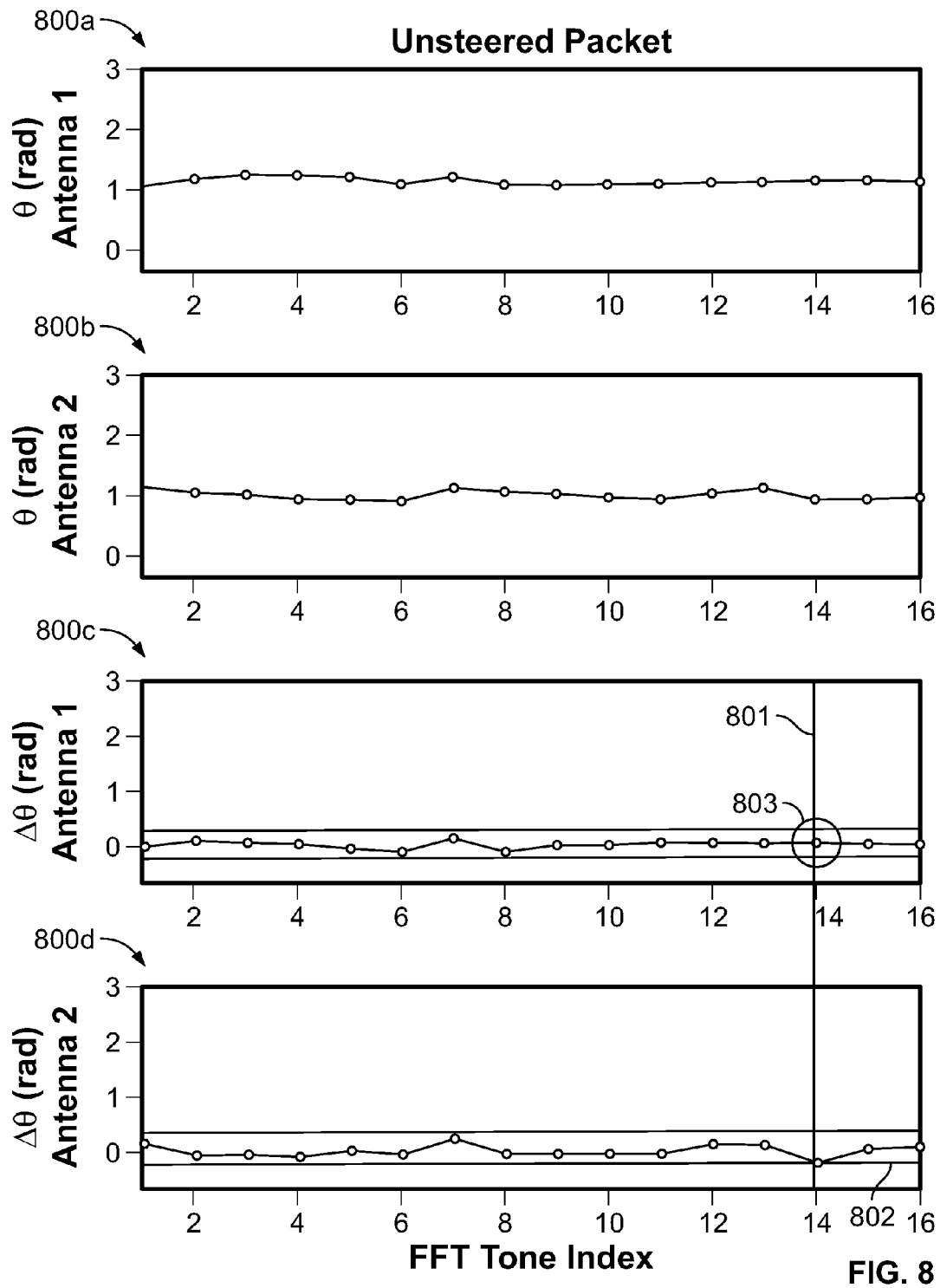
FIGS. 8-9 provide exemplary charts illustrating an example phase profile for an unsteered (non-beamformed) packet or a steered (beamformed) packet, respectively, according to one embodiment described herein.
Figure 9:
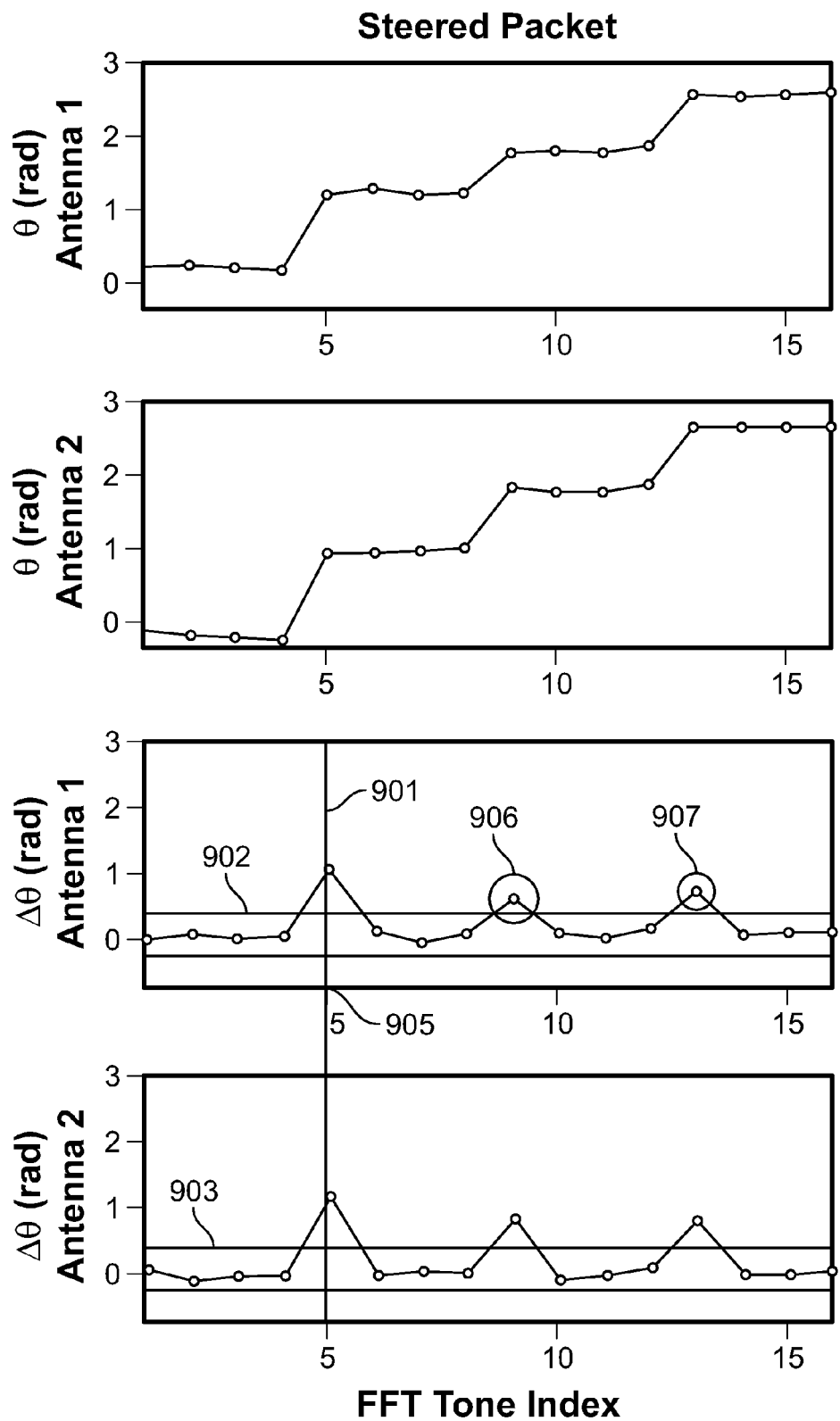

FIGS. 8-9 provide exemplary charts illustrating an example phase profile for an unsteered (non-beamformed) packet or a steered (beamformed) packet, respectively, according to one embodiment described herein. As shown in FIG. 8, each of the data plot chart 800a-b shows the phase profile at different FFT tone indices for antenna 1 or antenna 2, respectively. The data plot chart 800c-d shows the phase difference at different FFT tone indices for antenna 1 or antenna 2, respectively. The line 801 shows a tone where the differential phase has crossed the threshold, indicated by the line 802 at antenna 2, which may indicate a phase jump. However this is not a 'true' phase jump as the threshold is not exceeded at antenna 1 (see 803) at this tone. Thus in this case the jump count is 0.

In FIG. 9, line 901 shows one of the tones where the differential phase has crossed the thresholds 902 and 903 at both the antennas at the indicated tone. So, this is a true jump. The jump count in this case is 3, e.g., true jumps at 905, 906 and 907.

Figure 10:
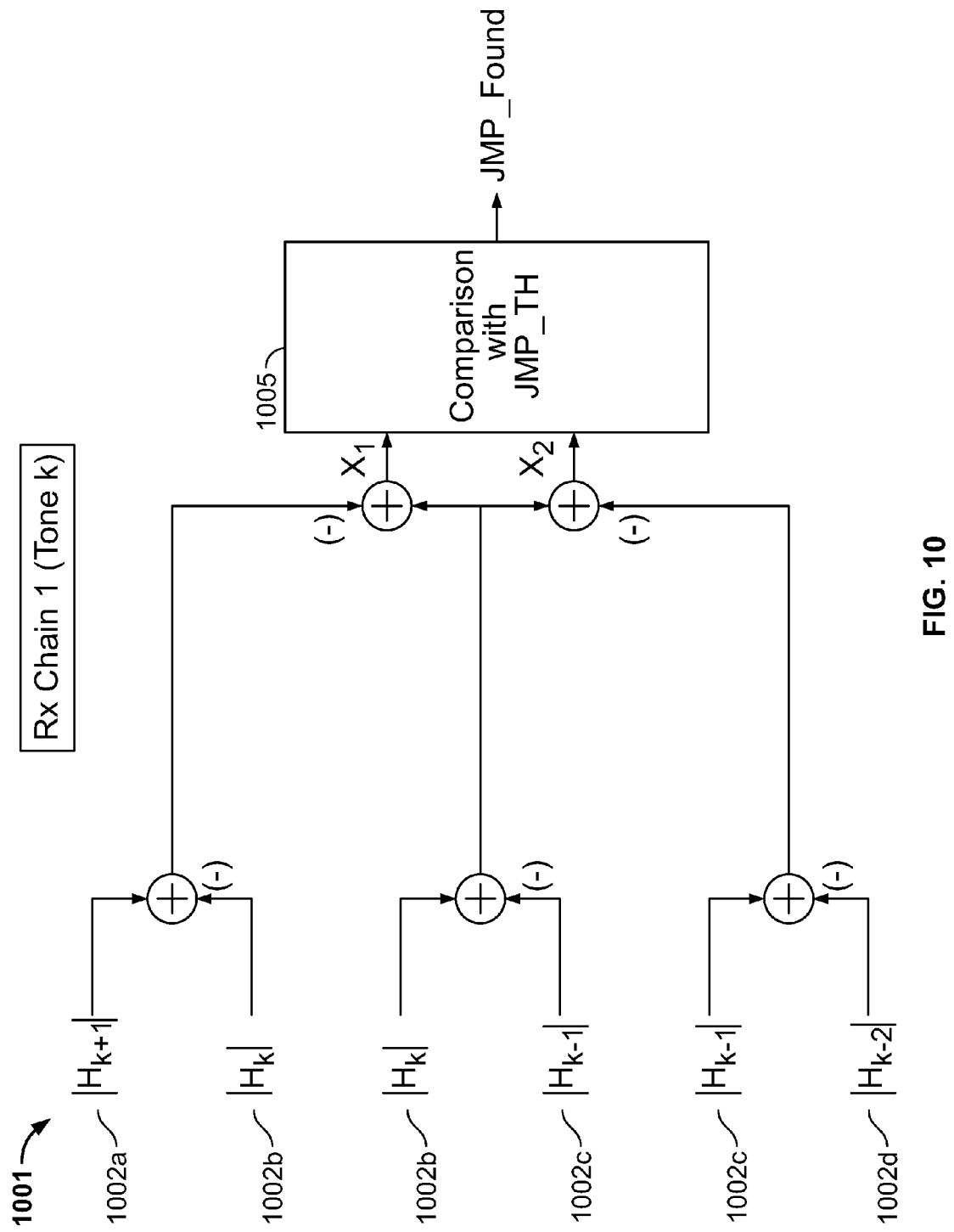
FIGS. 10-11 provide exemplary block diagrams illustrating alternative implementations of a magnitude based jump counting scheme, according to one embodiment described herein.
Figure 11:
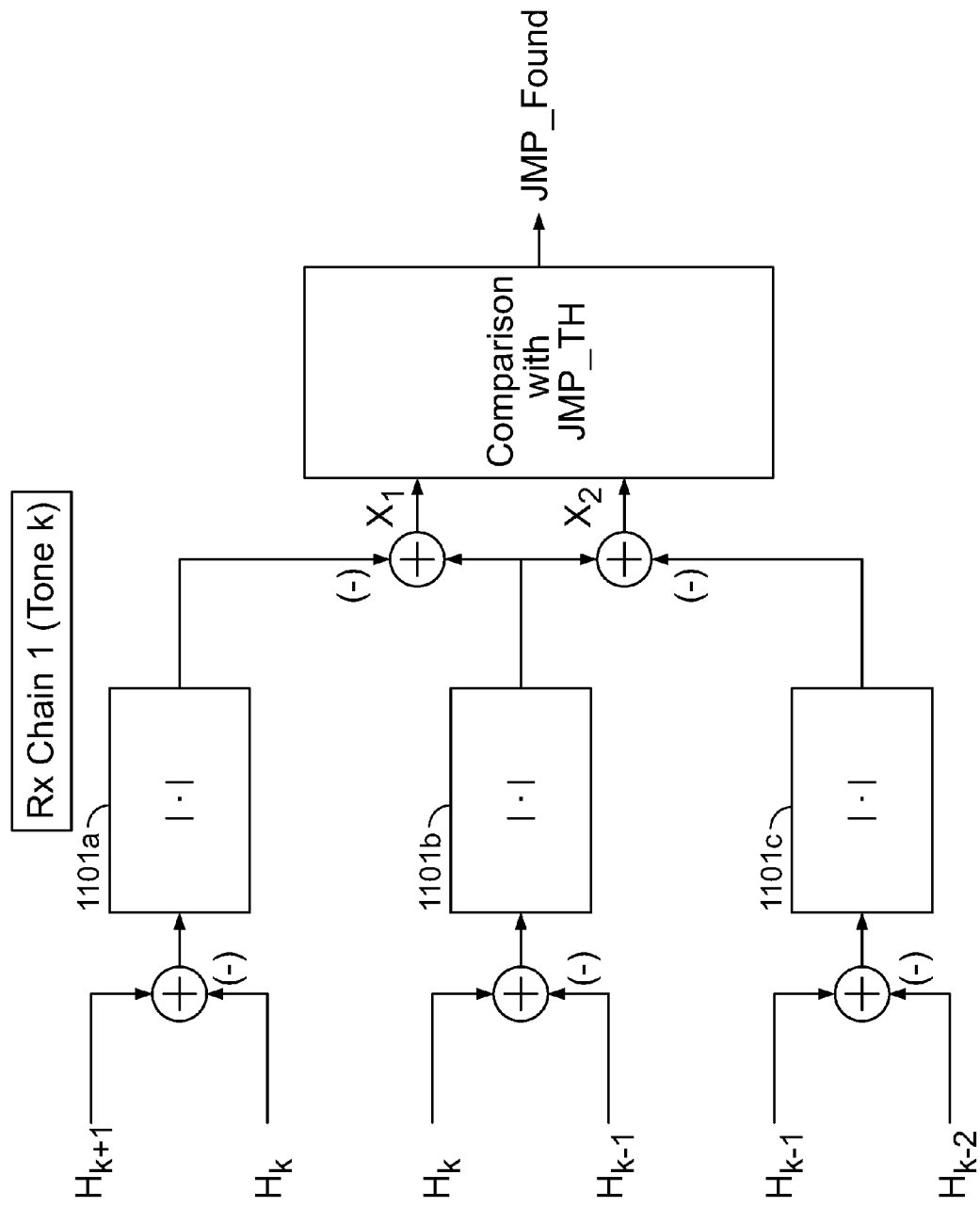

FIGS. 10-11 provide exemplary block diagrams illustrating alternative implementations of a magnitude based jump counting scheme, according to one embodiment described herein. Instead of examining phase jump of channel estimates as described in FIGS. 2-9, magnitude jump of channel estimations may be used for identification of beamformed/non-beamformed packets. As shown in FIG. 10, the overall work flow can be similar to the phase jump counting scheme illustrated in FIG. 3, but the magnitude jump counting scheme 101 adopts magnitudes 102a-d of channel estimate instead. No wrap angle module is necessary as the output of the magnitude phase does not need to be adjusted. The magnitudes difference may be compared with a threshold at 105, which may determine whether a magnitude jump is found.

In different implementations, the absolute value of the magnitudes may be taken at the magnitudes directly, e.g., see 102a-d in FIG. 10, or be taken at the magnitude differences, e.g., 1101a-c in FIG. 11.

It is noted that in FIGS. 10-11, a single jump threshold has been used. In another implementation, a two-jump thresholds JMP_TH_MIN and JMP_TH_MAX. At a given tone, JMP_TH_MAX shall be crossed at all receive chains and JMP_TH_MIN shall be crossed at least one of the receive chains for qualifying as a "true jump".

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure.

The above-described embodiments of the present disclosure are presented for purposes of illustration and not of limitation, and the present disclosure is limited only by the claims that follow.

What is claimed is:

1. A method for detecting beam-formed orthogonal frequency division multiplexing (OFDM) packets to determine a data symbol processing procedure in response to a beam-formed packet, the method comprising:
   receiving, at a wireless receiver, a data signal including a data packet;
   selecting a set of frequency domain tones associated with the data signal for channel estimation;
   calculating a plurality of differential parameters between adjacent frequency domain tones from the set of frequency domain tones;
   identifying a jump when a first differential parameter from the plurality of differential parameters exceeds a jump threshold;
   obtaining an accumulative count of jumps for the set of frequency domain tones;
   identifying the data packet is beam-formed when the accumulative count exceeds a jump limit; and
   selecting a data symbol processing procedure to decode the data packet based on whether the data packet is beam-formed.

2. The method of claim 1, wherein the set of frequency domain tones are obtained via fast Fourier transform of the received data signal.

3. The method of claim 1, wherein the differential parameters are selected from a group of phase differences and magnitude differences.

4. The method of claim 1, wherein the jump threshold is selected from a group of a two-sided threshold and a one-sided threshold.

5. The method of claim 1, wherein the jump is a first jump associated with a first receiver chain, and the method further comprising:
   identifying a second jump associated with a second receiver chain; and
   identifying a true jump when both the first jump and the second jump are identified.

6. The method of claim 5, wherein the first jump is not added to the accumulative count when no jump is identified with the second receiver chain.

7. The method of claim 5, wherein the accumulative count includes a number of true jumps when there are more than one receiver chain.

8. The method of claim 5, further comprising:
   accumulating a number of true jumps across the set of frequency domain tones.

9. The method of claim 1, wherein the jump threshold or the jump limit is configured to depend on a power of the received data signal.

10. A system for detecting beam-formed orthogonal frequency division multiplexing (OFDM) packets to determine a data symbol processing procedure in response to a beam-formed packet, the system comprising:
    a wireless receiver configured to receive a data signal including a data packet;
    a channel estimation module configured to select a set of frequency domain tones associated with the data signal; and
    a jump counting module configured to:
        calculate a plurality of differential parameters between adjacent frequency domain tones from the set of frequency domain tones,
        identify a jump when a first differential parameter from the plurality of differential parameters exceeds a jump threshold,
        obtain an accumulative count of jumps for the set of frequency domain tones, and
        identify the data packet is beam-formed when the accumulative count exceeds a jump limit; and
    a data symbol processing module to select a data symbol processing procedure to decode the data packet based on whether the data packet is beam-formed.

11. The system of claim 10, wherein the set of frequency domain tones are obtained via fast Fourier transform of the received data signal.

12. The system of claim 10, wherein the differential parameters are selected from a group of phase differences and magnitude differences.

13. The system of claim 10, wherein the jump threshold is selected from a group of a two-sided threshold and a one-sided threshold.

14. The system of claim 10, wherein the jump is a first jump associated with a first receiver chain, and the jump counting module is further configured to:
    identify a second jump associated with a second receiver chain, and
    identify a true jump when both the first jump and the second jump are identified.

15. The system of claim 14, wherein the first jump is not added to the accumulative count when no jump is identified with the second receiver chain.

16. The system of claim 14, wherein the accumulative count includes a number of true jumps when there are more than one receiver chain.

17. The system of claim 14, wherein the jump counting module is further configured to:
    accumulate a number of true jumps across the set of frequency domain tones.

18. The system of claim 10, wherein the jump threshold or the jump limit is configured to depend on a power of the received data signal.

* * * * *